US006285458B1

United States Patent
Yada

(10) Patent No.: US 6,285,458 B1
(45) Date of Patent: *Sep. 4, 2001

(54) IMAGE PROCESSING APPARATUS AND METHOD

(75) Inventor: Shinichi Yada, Ebina (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,381

(22) Filed: Jul. 30, 1997

(30) Foreign Application Priority Data

Jul. 31, 1996 (JP) .................................................. 8-202161

(51) Int. Cl.[7] .................................................... B41B 1/00
(52) U.S. Cl. ......................................... 358/1.15; 358/1.13
(58) Field of Search .................................. 395/114, 112, 395/115, 116, 101; 358/426, 261.1, 261.2, 261.3, 261.4; 382/239, 176, 180; 341/51, 95, 63, 107

(56) References Cited

U.S. PATENT DOCUMENTS

| 5,479,587 | * | 12/1995 | Campbell et al. | 395/114 |
| 5,535,311 | * | 7/1996 | Zimmerman | 395/114 |
| 5,611,024 | * | 3/1997 | Campbell et al. | 395/114 |
| 5,771,340 | * | 6/1998 | Nakazato et al. | 395/114 |

* cited by examiner

Primary Examiner—Dov Popovici
(74) Attorney, Agent, or Firm—Oliff & Berridge, PLC.

(57) ABSTRACT

An image process apparatus, for use with image data combining areas of different image characteristics such as text and photos, which achieves a predetermined target compression rate and simultaneously minimizes quality deterioration after decompression, is described. The image analysis circuit analyzes the composition of the entire image data and calculates the optimum compression parameter. The compression process is performed using a selected compression method for each predetermined block. At the time of compression, the value of the parameter is used in order to select an appropriate compression method by switching compression methods among a plurality of compression methods for each block unit. Using optimum compression minimizes the amount of memory required to store the information.

18 Claims, 13 Drawing Sheets

BLOCK-INTERNAL SINGLE-COLOR APPROXIMATION COMPRESSION

| TAG | CENTRAL VALUE Q0 |
|---|---|
| 00 | 8bit |

BLOCK RUN-LENGTH COMPRESSION

| TAG | CENTRAL VALUE Q0 | RUN-LENGTH |
|---|---|---|
| 01 | 8bit | 8bit |

BLOCK TWO-COLOR APPROXIMATION COMPRESSION

| TAG | CENTRAL VALUE 1 | CENTRAL VALUE 2 | PIXEL VALUE |
|---|---|---|---|
| 10 | 8bit | 8bit | 4×4×1bit |

BLOCK FOUR-COLOR APPROXIMATION COMPRESSION

| TAG | CENTRAL VALUE 1 | CENTRAL VALUE 2 | CENTRAL VALUE 3 | CENTRAL VALUE 4 | PIXEL VALUE |
|---|---|---|---|---|---|
| 11 | 8bit | 8bit | 8bit | 8bit | 4×4×2bit |

Fig. 4

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 28 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

(a) LOW QUANTIZATION

| 30 | 22 | 20 | 32 | 48 | 80 | 102 | 122 |
|----|----|----|----|----|----|-----|-----|
| 24 | 24 | 28 | 38 | 52 | 116 | 120 | 110 |
| 28 | 26 | 32 | 48 | 80 | 114 | 138 | 112 |
| 28 | 34 | 44 | 58 | 102 | 174 | 160 | 124 |
| 36 | 44 | 72 | 112 | 136 | 118 | 206 | 154 |
| 48 | 70 | 110 | 128 | 162 | 208 | 226 | 184 |
| 98 | 120 | 156 | 174 | 206 | 242 | 255 | 255 |
| 144 | 184 | 190 | 196 | 224 | 200 | 255 | 255 |

| 34 | 36 | 50 | 100 | 200 | 200 | 200 | 200 |
|----|----|----|-----|-----|-----|-----|-----|
| 36 | 45 | 50 | 100 | 200 | 200 | 200 | 200 |
| 50 | 50 | 100 | 200 | 200 | 200 | 200 | 200 |
| 100 | 100 | 200 | 200 | 200 | 200 | 200 | 200 |
| 200 | 200 | 200 | 200 | 200 | 200 | 200 | 200 |
| 200 | 200 | 200 | 200 | 200 | 200 | 200 | 200 |
| 200 | 200 | 200 | 200 | 200 | 200 | 200 | 200 |
| 200 | 200 | 200 | 200 | 200 | 200 | 200 | 200 |

(b) HIGH QUANTIZATION

Fig. 11

IMAGE PROCESSING APPARATUS AND METHOD

BACKGROUND OF THE INVENTION

1. Field of Invention

The present invention relates to a digital image processing apparatus, and more particularly to compression of the image data.

2. Description of Related Art

In recent years, digital photocopiers which generate a hard copy of a manuscript by reading the manuscript image using an image input apparatus, for example a scanner, digitally processing the input image data, and outputting the digitally processed data to an image output apparatus, for example a printer, have come into widespread use.

In the digital photocopier, it is essential to store a plurality of the image data in the photocopier, have an electronic sorter function which sorts the data (for example, manuscript, files, and edits pages), and to have an electronic RDH function. This is accomplished by equipping the copier with an interval data storage apparatus, for example, random access memory or a hard disk, storing the image data therein and outputting the data as necessary. In order to store a large amount of image data, it is necessary to increase the storage capacity of the storage apparatus, but this results in an increase in the size and cost of the apparatus itself. In order to avoid this, a method of storage that compresses the image data has been proposed. By compressing the image data, it is possible to store a large amount of the image data using smaller-capacity storage apparatus.

Furthermore, the image output apparatus maybe a laser printer. In general, a page descriptive language is used for controlling the method of image output to the printer. A host computer, to which the printer is connected, does not transfer to the printer the output content itself as a bitmap image (raster image) but rather the content of the page descriptive language describing the character and image information of that output content. The printer receives the page descriptive language, internally interprets the language content, render the image data of the page as a bitmap image (raster image), and outputs the image by transferring the image to the paper.

Therefore it is essential to have sufficient printer memory to maintain the bitmap image which renders the image data and a function to interpret the content of the page descriptive language. For example, memory would require 32 megabytes if the output resolution is 400 dpi and the output gradation degree is 256 steps, in the case of a monochrome printer which outputs A3 size paper.

In the case of a color printer, the output of YMCK 4 colors is needed, so the memory capacity becomes four times larger, to 128 megabytes. Obtaining such large memory capacity necessarily increases the size, cost, etc., of the printer itself. To avoid this increase in memory capacity, just like the case of the digital photocopier, the image data can be stored in the compressed format. In doing so, large amounts of image data can be stored using smaller memory capacity.

In the case of compressing the image data and reducing the data capacity, reducing the gradation degree of the image repeatedly and storing the image in a binary state can be considered, however, the quality of the image output which can be eventually obtained deteriorates when the gradation degree is reduced. Thus, in order to store images of high quality, it is better to store the image in a multi-value state rather than in a binary state.

In order to compress this multi-value image data, many methods exist.

With manuscripts output by digital photocopier or printer, it is often the case that text area and photo area co-exist on a single sheet. Additionally, with printer output images, there are many manuscripts that mix both images created by computer, or so-called computer graphics (CG), and photos and other such read-in images scanned from a scanner.

These CG and scanned images each have different image characteristics. For instance, CG image areas include many flat areas in which the pixel values fluctuate either uniformly or not at all. Furthermore, even within the CG image area, the character area in which only the white and black binary exists and the gradation area in which the original element value drastically changes also exists. In contrast, in many instances the scanned images area includes noise picked up during reading by a scanner, causing minute fluctuations in the pixel value.

Additionally, the CG and scanned image boundaries have different image characteristics. For this reason, effectively compressing mixed image data with high quality requires the optimum compression process for each set of image quality characteristics. In order to meet this need for image data mixing small areas having varied image characteristics it is necessary to select the optimum compression process for each area depending on the image characteristics.

An adaptive image compression method has often been proposed. The CG area, often including images requiring a high degree of resolution such as characters, line drawings, and the like, a compression method in which the resolution data does not deteriorate is preferred. For example, reversible compression methods such as MMR, LZW, JBIG and the like and block compression methods such as BTC and the like, in which the gradation data deteriorates but the resolution data does not, are appropriate.

Scanned image areas often include images requiring gradation data more than resolution data, for example photos, natural images, and the like, where a compression method in which the gradation does not deteriorate is preferred. In the case of applying the reversible compression method in which the image does not deteriorate after decompression to the scanned image area, the pixel values severely change in this area and entropy is high, so it is not possible to effectively compress data by the reversible compression method.

Therefore, the non-reversible compression method is applied for the scanned images area. Among the non-reversible compression methods, a method which is able to maintain the gradation data after decompression is used. For instance, there is the Adaptive Discrete Cosine Transform (ADCT) method or the like, typified by the JPEG baseline, which is used as the standard encoding method for color facsimile.

One object of the invention is to select image compression means resulting in a reduction in required memory in an image processing device.

Another object of the invention is to compare the compressed image data to a target and reselect and recompress the data until the target is satisfied.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations pointed out in the appended claims.

SUMMARY OF THE INVENTION

The present invention has as its main purpose the reduction of the required memory capacity using an adaptive image compression method in a digital photocopier, printer, or the like. The memory capacity is set at less than the original amount of data of the image to be compressed, so the image compression circuit needs to compress the original image data in order for the image data to fit into the memory. Where the compressed image data exceeds the memory capacity, it is not possible to decompress the image data completely, so it is necessary to set the image compression circuit so as to enable the target encoding amount (target compression rate) to fit into the memory and to compress the data in order to clear that compression rate.

When using fixed-length data compression as a compression method, the rate at which the image data is compressed remains fixed and relatively constant no matter what the input image. If this fixed compression rate clears the target compression rate, the encoding data amount will fit within the reduced memory capacity regardless of the input image. In general, however, with fixed length compression the methods in which the image quality deterioration of the decompression image is not striking contribute only marginally to memory capacity reduction because the compression rate is approximately ½ to ¼.

In contrast, in the case of the variable-length compression method, the compression rate varies depending upon the complexity of the image data to be compressed. Furthermore, the compression rate fluctuates depending also on the parameter settings at time of compression, while at the same time, the image quality of the decompression image fluctuates, depending upon the parameter settings. Generally, in the case of the non-reversible variable compression, when the parameters are set so as to increase the compression rate, the image quality tends to deteriorate. Conversely, when setting the parameters so as to improve the image quality of the decompression image, the compression rate tends to deteriorate.

When using the variable compression method with extremely complex images, the compression rate does not reach the target compression rate, and as a result, it is possible to exceed the target encoding amount. In this situation, it is necessary to degrade the image quality and set the parameters so as to increase the compression rate in order to reach the target compression rate.

When compressing mixed CG and scanned images using the adaptive image compression method, which performs the appropriate compression process for each image area, the compression rate fluctuates sharply. The fluctuation rate depends upon both the proportion of each image area having different image characteristics which is included in the input image, as well as the image composition.

For example, when the entire image consists of complex scanned images, and if the adaptive image compression is performed with the parameters set so as to maintain image quality, then the compression rate of the entire image becomes approximately ¼–⅙. However, if the entire image is CG, consisting of characters, drawings, and the like, with large areas of flat background, then the compression rate becomes ¹⁄₁₀₀ or more even though the compression parameters are set at the same settings as for the aforementioned entire scanned images.

Because with conventional adaptive image compression the compression rate fluctuates sharply depending upon the image composition, if the input image needs to be less than the target encoding amount, then the minimum compression rate needs to be set at approximately ¼–⅙, for example, in the case of wholly scanned images. However, it is impossible to effectively reduce the memory capacity with this amount of compression.

If the parameters are set high in order to increase the compression rate of the scanned images, the encoding amount can be held to the target encoding amount. However, when compressing mixed CG scanned images, there is a concern that there will be an overcompression which compresses the image by a compression rate higher than necessary. This results in greater-than-necessary deterioration in image quality when setting the parameters for images in which the scanned images account for a small proportion of the overall image.

When applying the adaptive image compression method to mixed co-scanned images, there are cases which satisfy the target compression rate for the image as a whole even though the compression rate of the scanned image area is low. Thus, prior to the present invention, controlling the compression rate of mixed images was extremely difficult.

The present invention was invented in order to solve the above types of problems. In addition to minimizing deterioration of the decompression image quality, by selecting the optimum compression process for each area for image data mixing small areas having different image characteristics, the invention also analyzes the image composition of the entire image data and reflect the results of that analysis in the selection of the compression process method of each area, providing an image processing apparatus which is able to attain the target compression rate for the entire image.

The image processing apparatus of the present invention has a selection means which selects from among a plurality of compression means which covers a certain area of the image data input by the input means. The plurality of compression means consists of different compression methods. Additionally, the apparatus has an analysis means which analyzes the image characteristics of the entire image data and a selection means structured so as to select the compression means depending upon the results of the analysis performed by the analysis means.

Thus, image data from the input means is obtained and is analyzed by the analysis means to determine what areas having which kinds of image characteristics exist therein—in other words, the image composition of the entire image data is analyzed and the compression parameters set for each of a plurality of compression methods. During compression, the optimum compression method is selected from among the plurality of the compression methods as per the analysis results per area, and it is possible to achieve the target compression rate for the entire image data because the compression parameter value is used as an entire image data.

In another embodiment, the image processing apparatus is constructed so as to enable the analysis means to calculate the proportion of areas having different image characteristics included in the image data. Thus, by setting the compression parameter to reflect the area ratio (which is easily grasped by sight) it is possible to minimize the image deterioration of the decompression image while achieving the target compression rate.

A further embodiment of the image processing apparatus maintains the amount of the encoding data as a target encoding amount which shows the compression rate of the entire image targeted, and outputs the compression rate as encoded data by the compression means which was selected by the selection means. The image processing apparatus can monitor the encoding amount of this encoding data by the encoding amount monitoring means, and can compare the encoding amount with the target encoding amount by the encoding amount comparison means.

In this manner, it is possible to achieve the target compression rate by managing both the compression rate of the targeted image data and the compression rate achieved by the compression means selected by using the compression rate as the encoding data amount, and thus being able to understand the status at any time.

In addition, the image processing apparatus is constructed so as to change the analysis result and redo the selection of the compression means whenever the encoding amount obtained from the encoding amount monitoring means exceeds the target encoding amount, as compared by the encoding amount comparison means. Thus, when the target encoding amount is exceeded during compression by management of the encoding amount the compression parameters are changed to reflect the image characteristics and the compression method is reselected. Thus, it is possible to achieve the target compression rate because of this feedback function.

In another embodiment, the image processing apparatus has an input means which inputs the coded image data into page description language (PDL), a rasterizing means for the rasterization of PDL image data, a plurality of compression means consisting of different compression methods, a compression means which covers a certain area of the raster data, and a selection means which selects from the plurality of compression means. Moreover, the image processing apparatus has a discernment means which discerns the image attributes of the entire coded image data, and the selection means is constructed so as to select the compression means according to the discernment result.

When used for printers and the like, the image data described by the page description language is received by the printer, and this described code is interpreted and rendered into the raster image; and simultaneously, the image composition and characteristics of the entire image are discerned from the described code. Based upon this discernment result, compression is performed by selecting for each area, from among the plurality of compression methods, that compression means which should cover the raster image data and the results stored in the code memory.

Additionally, the image processing apparatus is constructed so as to obtain by the discernment means the area proportion of the area which is included in the code image data having different image attributes. Therefore, compression parameters reflecting area ratios easily grasped by sight are set and it is possible to minimize the image quality deterioration of the decompression while achieving the target compression rate.

BRIEF DESCRIPTION OF THE DRAWINGS

FIG. 4 is a diagram depicting one example of the encoding data format of the preferred embodiment.

FIG. 11 is a diagram depicting one example of the quantization table of the third embodiment.

DETAILED DESCRIPTION OF PREFERRED EMBODIMENTS

Figure 1:
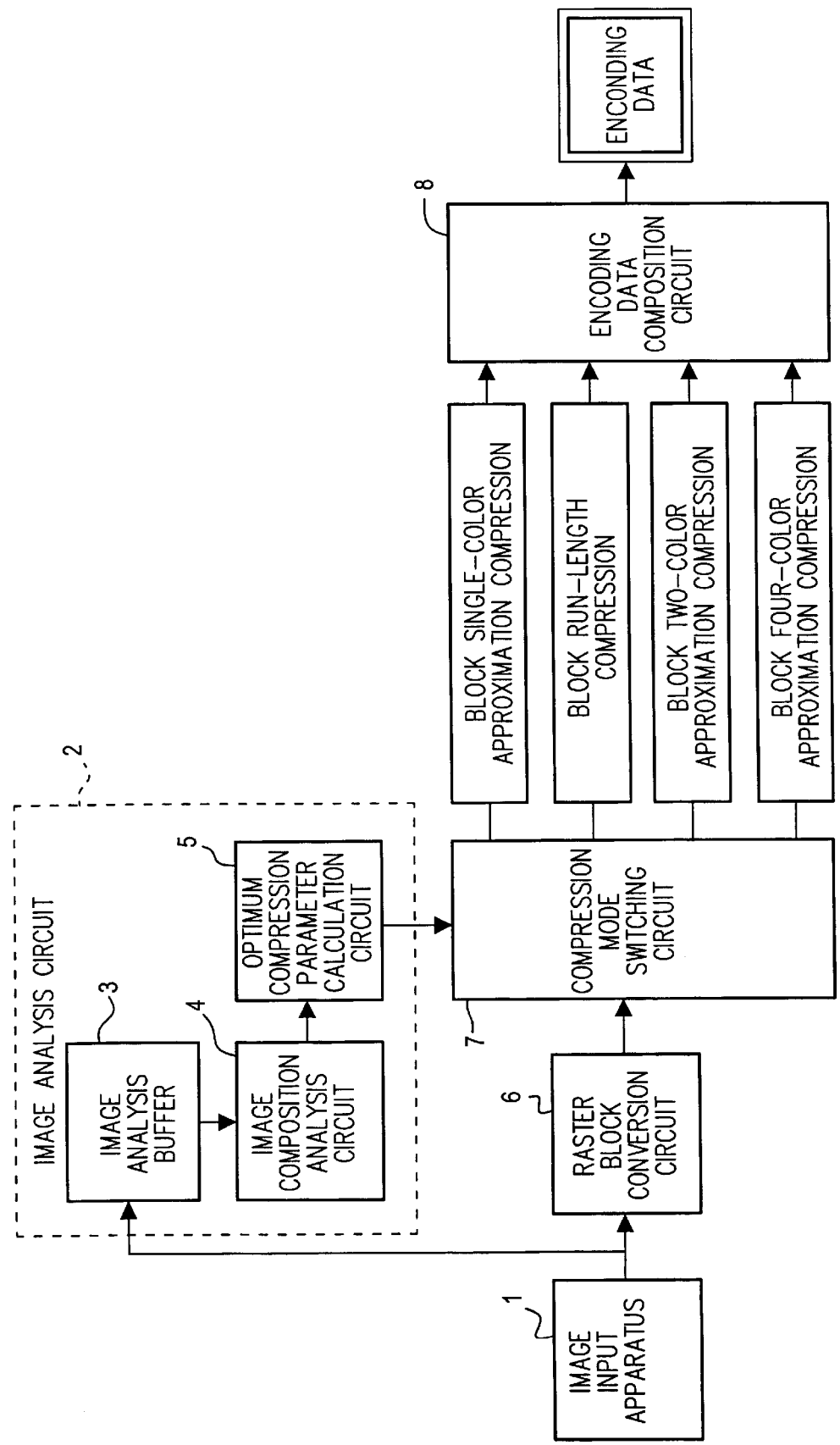
FIG. 1 is a block diagram depicting the encoding circuit of the invention.

The following explains in detail the image processing apparatus of the embodiments of the present invention by referring to the drawings. In the following explanation, a monochrome image data consisting of an image of 8 bits/pixel is used as the original image data, However, the present invention is not limited to this. The full color image of 24 bits/pixel of RGB, LTaTbT, YCrCb, XYZ, Luv and the like, or the full color image total of 32 bit/pixel of YMCK for each 8 bits/pixel are also applicable. The bit number for per pixel can be either 8 or 16 bits; either is possible.

Figure one is a block figure which shows an example of the composition of the encoded circuit of the image processing apparatus of the first embodiment. A picture block size of 4×4 is used for this explanation even though this embodiment is not limited to this. The image data, which is input from the image input apparatus 1 acting as the input means, is sent to the image analysis buffer 3 of the image analysis circuit 2 acting as a temporary analysis means. The image composition analysis circuit 4 analyzes the construction included within the image by referring to the data of the image analysis buffer 3.

The optimum compression parameter calculation circuit 5 refers to the analysis result of the image composition analysis circuit 4 and determines the threshold value which is used to determine the logic and therefore which compression method is selected per block. This optimum compression parameter calculation circuit 5 sets the threshold parameters so as to keep the compression rate of the entire image below the target compression rate.

For example, if the image is complex and there is a possibility of being unable to achieve the compression rate which the image processing apparatus targets, the apparatus sets the threshold value which most often determines the compression mode which is able to achieve the higher compression rate. In the case of a simple image, the apparatus sets the threshold value which determines a compression mode in which there is a low compression rate but a better image quality. As a result, it is possible to bring the compression rate of the entire image closely to the compression rate that the apparatus targets.

After the above image analysis process is completed, the image compression process begins. In the raster block conversion circuit 6, the input image is broken into 4×4 pixel block units and sent to the compression mode switching circuit 7. The compression mode switching circuit 7 selects which compression method is applicable among the plurality of the compression methods, based upon the threshold value information obtained from the optimum compression parameter calculation circuit 5. In this embodiment, the compression mode switching circuit 7 is a selectable compression method with four compression modes: block single-color approximation compression mode, block run-length compression mode, block-internal two-color approximation compression mode, and block-internal four-color approximation compression mode.

The encoding data composition circuit 8 treats per-block encoding data as a single unit and adds in front of that data a tag signal which shows the selected compression circuit. In addition, it aligns the encoding data which is output from the four compression circuits in one bit stream and outputs it as encoding data.

The following explains each construction element of this embodiment in detail.

The image input apparatus 1 is the interface which receives a raster image. Just like a scanner, the image input apparatus 1 is considered to read the manuscript and convert the image into digital data; and like an external interface, the image input apparatus 1 receives the image from the outside network directly as digital data, or the circuit which receives the raster data from a decomposer which outputs the raster image data in the case of a post script printer.

The raster block conversion circuit 6 is the circuit which outputs the 4×4 pixel as one unit as one block.

The image analysis circuit 2 consists of the image analysis buffer 3, the image composition analysis circuit 4, and the optimum compression parameter calculation circuit 5, and analyzes the image data received from the image input apparatus 1. The image analysis circuit 2 receives one page of image data from the image input apparatus 1 and then stores it in the image analysis buffer 3.

By referring to the data in the image analysis buffer 3, the image composition analysis circuit 4 analyzes the composition which is included within the image. In other words, different areas included within the image having different image characteristics—for example, characters/drawings, CG, and scanned images areas—are discerned, the coordinates which the area covers, the largest gradation number within the area, and its degree of complexity are determined and the area proportion per area is calculated.

In this embodiment, the image composition analysis circuit 4 calculates each area proportion of (1) background area, (2) character/drawing area, (3) CG area, and (4) scanned images area, and outputs that area proportion to the optimum compression parameter calculation circuit 5. By referring to the results from the image composition analysis circuit 4, the optimum compression parameter calculation circuit 5 determines the threshold value which is used in the logic which determines which compression method is selected per block.

The minimum and maximum values of the coordinates of each area can be used to calculate this area proportion for each area. In addition, a counter to count the number of pixels included in each area can be installed and the count value of this counter can be taken as the area. It is also appropriate to install the counter, which breaks the input image into blocks of a predetermined size and counts the number of blocks included in each area, and the count of this new counter can be taken as the area.

Figure 2:
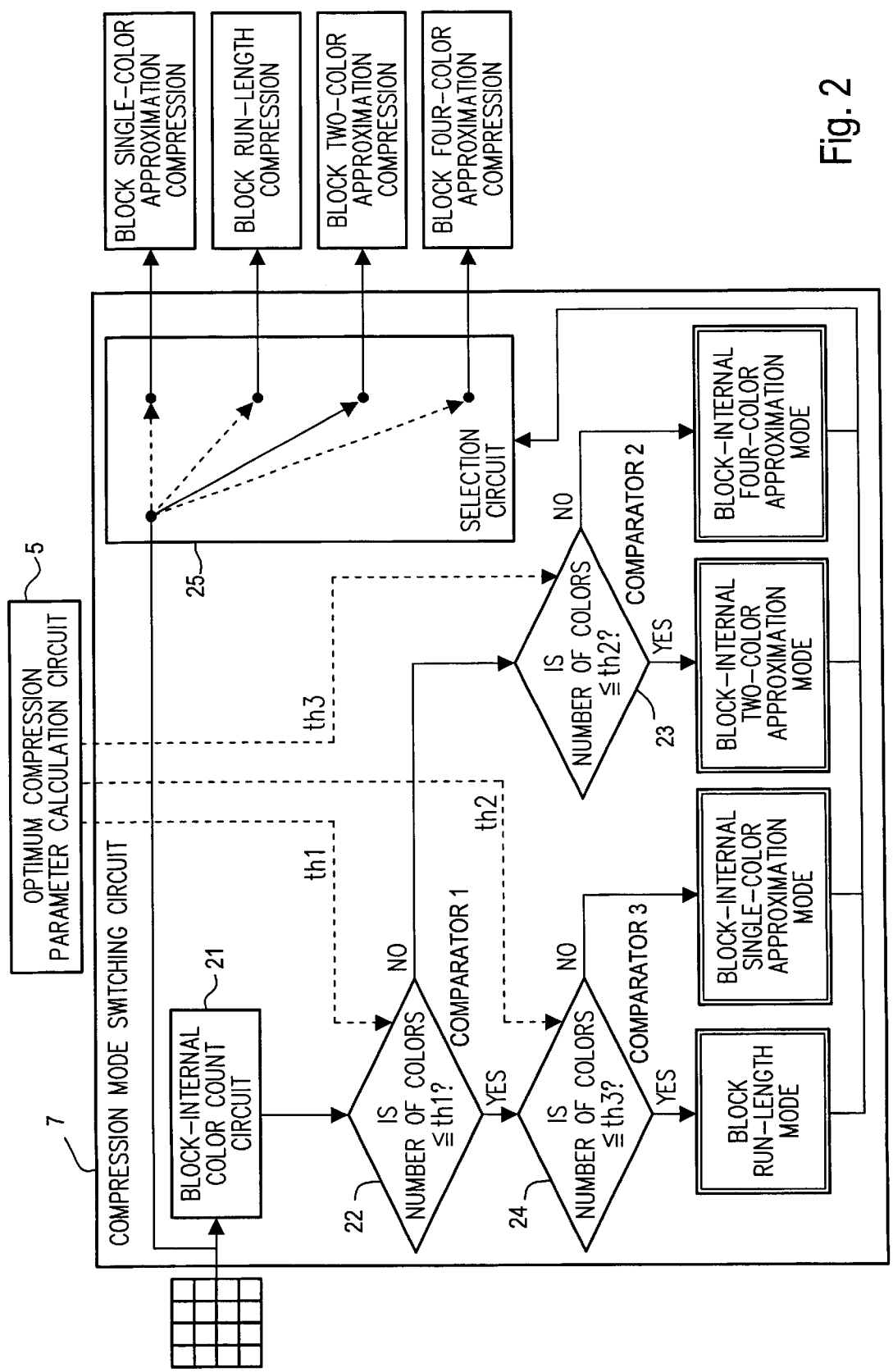
FIG. 2 is a block diagram depicting the compression mode switching circuit of the invention.

The compression mode switching circuit 7, which acts as a selection means, selects which compression method is suitable for each block among the plurality of compression methods, based upon the threshold value information obtained from the optimum compression parameter calculation circuit 5. The details of the compression mode switching circuit 7 are shown in FIG. 2. The compression mode switching circuit 7 is able to select among these four modes: block-internal single-color approximation compression mode, block run-length compression mode, block-internal two-color approximation compression mode, and block-internal four-color approximation compression mode.

The following is a detailed explanation of each compression method.

First, the block-internal single-color approximation compression mode is the compression method which approximately expresses the entire block in one color. It calculates the average of the pixel values within the entire block, and expresses the entire block as an average value. In the case of the 8 bit/pixel 4×4 pixel block, the original data amount can be expressed below as:

8 bit/pixel×(4×4)=128 bit/block

The encoded data amount of the single-color approximation compression mode within the block is only the 8 bit which shows the average value, so the compression rate can be expressed as:

$8/128 = 1/16$

This compression mode applies to solid areas where a relatively high-resolution expression is not needed, such as areas of uniform pixel values like image backgrounds, etc., average uniform colors of thick lines and CG graphics and the like.

The block run-length compression mode is the mode which approximately expresses both the number of identical blocks that continue (run-length), and the entire block, as one color. For such blocks, after performing the block-internal single-color approximation process, the number of blocks through which identical blocks continue is counted, encoded, and output as continuous numbers and run length.

The encoded data amount of the block run-length compression mode combines the 8 bit which shows the average value in the block and the 8 bit which shows the run length, for 8+8=16 bit. The compression rate of this mode fluctuates depending on the value which the run-length can take. As the run-length becomes larger, the compression rate increases, and as the run-length becomes smaller, the compression rate declines.

In case of the minimum value 2 of the run length, the compression rate is:

16/(128+128)=⅛

Thus, the compression rate of this block run-length compression mode becomes ⅛ or more. This compression mode is applied to those areas which do not need comparatively high-resolution expression, in which the uniformed pixel value continues over a wide range such as the background area of the image and the like.

The block-internal two-color approximation compression mode is the compression method which approximately expresses the entire block with two colors. The number of colors within the block is counted and when the number of colors is less than two, the two colors becomes the representative colors of the block. When the number of colors within the block is three, the block is expressed by approximating the pixel value within the block as two colors.

The method which approximately expresses using two colors for the pixel value within the block is able to be adapted to existing limited color techniques, such as the median cut method. The encoding data amount of the block-internal two-color approximation compression mode consists of the central value of the block ×2 and the pixel flag which shows which central value each pixel becomes.

The two central values is shown by each 8 bit and the pixel flag per pixel can be indicated by 1 bit per pixel. In the case of the 4×4 block, the data amount of the pixel flag is:

4×4×1 bit=16 bit.

Furthermore, the data amount of the central value is

8+8=16 bit

Therefore, the encoding data amount of the block-internal two-color approximation compression mode is:

16+16=32 bit. Thus, the compression rate of this mode is $^{32}/_{128}=¼$.

This compression mode is applied to areas which require picture quality of comparatively high resolution and which include the pixel value of two colors within the block. It is applied, for example, to areas which include the edges of characters/drawings and the like and areas which include the dither matrix of the dither, etc., and CG gradations.

The block-internal four-color approximation compression mode is the compression method which approximates the entire block using four colors. The number of colors within such block is counted and the four colors become the central value of the block where the number of colors is four or less. Where there are five or more colors the pixel value of the block is approximated and expressed using four colors. The method which approximates and expresses the pixel value within the block using four colors can be adapted to the established limited color techniques just like the block-internal two-color approximation compression mode.

The encoding data amount of the four-color approximation mode within the block consists of the central value ×4 and the pixel flag which shows which central value out of four will apply to each pixel. The four central values are shown by each 8 bit and it is possible that the pixel flag per pixel is shown by 2 bit. In the case of the 4×4 block, the data amount of the pixel flag is:

4×4×2 bit=32 bit.

Moreover, the data value of the central value is

8×4=32 bit. Therefore, the encoding data amount of the block-internal two-color approximation compression mode is 32+32=64 bit.

Thus, the compression rate of this mode is $^{64}/_{128}=½$.

This compression mode applies to areas which need picture quality of comparatively high resolution, which include many colors within the block. For instance, it applies to areas which include scanned images and complicated CG.

The encoding data composition circuit 8 (FIG. 1) takes the encoding data per block as one unit and adds the tag signal which shows the compression circuit which was selected before the encoding.

The addition of a tag signal per block is because the encoding data length comprising one block differs with each compression mode. The bit number of the tag signal, even at minimum, needs enough bits to show independently the compression circuit. In this embodiment, because four circuits are used for the compression circuit, it is good to have two bits or more for the tag signal. The first embodiment uses 2 bits as the tag signal. FIG. 4 shows the format of the encoding data in each compression mode.

The compression mode switching circuit 7 receives the block image consisting of the 4×4 pixel from the raster block conversion circuit 6 and calculates how many kinds of pixel values within the block are available, that is, the number of colors within the block, using the block-internal color-count circuit 21 (FIG. 2). The block-internal color-count circuit 21 sends this color-count to comparator (1) 22.

Comparator (1) 22 compares the value calculated by the optimum compression parameter calculation circuit 5, which is the threshold value 1, with the color-count. As a result, if the number of colors is more than the threshold, then the process continues on to processing by comparator (2) 23, and if the number of colors is less than the threshold, then the process continues on to processing by comparator (3) 24.

Comparator (2) 23, just like comparator (1) 22, compares threshold value 2 which is calculated by the optimum compression parameter calculation circuit 5 with the number of colors. As a result, if the number of colors is more than the threshold value 2, then the block-internal four-color approximation mode is chosen as the compression mode for this block. If the number of colors is less than the threshold value 2, then the block internal two-color approximation mode is chosen as the compression mode.

Comparator (3) 24, just like comparator (1) 22 and comparator (2) 23, compares the optimum compression parameter calculation circuit 5 with the colors. As a result, if the number of colors is more than the threshold value 3, then the single-color approximation compression mode within the block is chosen as the compression mode. If the number of colors is less than the threshold value 3, then the block run-length compression mode is chosen as the compression mode. Selection circuit 25 refers to those determinations and switches the input block image to the appropriate compression circuit.

Figure 3:
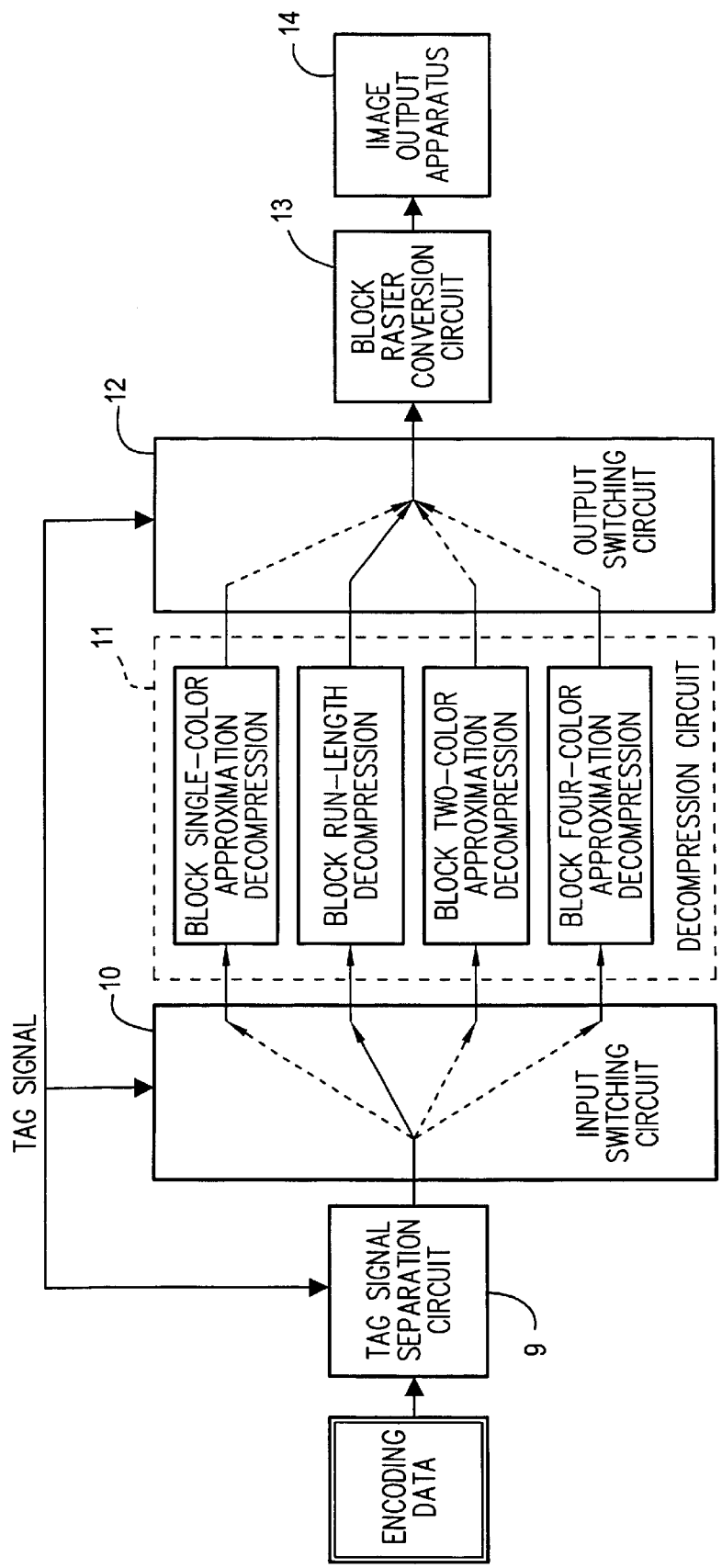
FIG. 3 is a block diagram depicting the decoding circuit of the invention.

FIG. 3 is a block figure which shows an example composition of the encoded circuit of the image processing apparatus of this embodiment. The encoded data which is output from the encoding data composition circuit 8 is sent to the tag signal separation circuit 9 and a predetermined number of bits of the tag signal is first separated from the peak data and isolated as the tag signal.

Depending upon the content of this tag signal, it is possible to determine which compression mode compresses the succeeding encoding data line. Because the code length of one block differs depending upon the compression mode selected, a one-block selection of the encoding data is read out from the succeeding data depending upon this compression mode.

For example, from the encoding data 8 bit is read out in the block-internal single-color approximation compression mode, 16 bit in the block run-length compression mode, 32 bit in the block-internal two-color approximation compression mode, and 64 bit in the block-internal four-color approximation compression mode. The read-out encoding data is sent to the input switching circuit 10.

Depending upon the tag signal, the input switching circuit 10 selects the decompression circuit appropriate to the encoding data from the plurality of decompression circuits 11 and sends the encoding data to the decompression circuit. Depending upon the compression circuit, the decompression circuit 11 has four decompression circuits: the block single-color approximation decompression circuit, block run-length decompression circuit, block-internal two-color approximation decompression circuit, and block-internal four-color approximation decompression circuit.

The block-internal single-color approximation decompression circuit receives 8 bits of the encoding data, takes this to be the average value within the block, paints the entire block with this average value, and outputs the result.

The block run-length decompression circuit receives 16 bits of encoding data and takes the first eight bits as the average value within the block and interprets the last eight bits as the run-length. This decompression circuit outputs continuously only the run-length number of blocks in which the entire block has been painted with this average value.

The block-internal two-color approximation decompression circuit receives 32 bits of the data and considers the first 8 bits to be the first block central value and the second 8 bits as the second block central value. It then disassembles the remaining 16 bits one by one and matches each to one block consisting of the 4×4 pixel=16 pixels to create a flag showing the central value corresponding to the position of each pixel. The flag per pixel is checked and if the flag is "0" the first central value for the pixel of the position is applied. If the flag is "1" the second central value is applied. This operation is carried out in one-block segments for one block and outputs one block of image data.

The block-internal four-color approximation decompression circuit receives 64 bits of data and disassembles the lead bits into four segments of 8 bits each, or 32 bits in total into four central values. The remaining 32 bits are broken up into two-bit segments matching each 4×4 pixel with two bits and creates a flag which shows the central value corresponding to the position of each pixel.

The flag is checked at each pixel and if the flag is "00" the first central value is applied to the pixel in that position. If the flag is "01", the second central value is applied. If the flag is "11" and "12", then the third and fourth central values are applied, respectively. This operation is carried out in one-block segments and outputs one block of image data.

As described above, there is virtually no numeric value arithmetic process in any decompression circuit, rather a simple logical operation is used. Compared with the compression circuit, the decompression circuit has a fairly simple construction. This makes image decompression with high speed possible. This is because decompression from the encoding data to the image data needs to be synchronized with the image output apparatus such as the printer and the like, and it is possible to output the image with high speed by simplifying the decompression circuit and gaining decompression speed.

The decompressed single-block section of the image data goes through the output switching circuit 12 which moves simultaneously with the input switching circuit 10 and is sent to the block raster conversion circuit 13. The block raster conversion circuit 13 converts the image data of the block unit to raster image data. The raster image data is sent to an image output apparatus 14, such as a printer, and is output as the image.

The following describes an example of the optimum compression parameter which is calculated by the image processing apparatus of this embodiment, depending upon the input image data. The optimum compression parameter is calculated in the optimum compression parameter circuit 5, based upon the area proportion of (1) the background area, (2) the characters/drawings area, (3) the CG area, and (4) the scanned image area, all of which is output from the image composition analysis circuit 4.

As previously discussed, the optimum compression parameter is used as the threshold value which is used to compare with the number of colors within the block within the determination logic for switching the compression method for each block within the compression mode switching circuit 7. In the image processing apparatus of this embodiment, three optimum compression parameters are used.

The following describes the characteristics of the three parameters, or threshold. The threshold value 1 (hereafter th1) considers the block compression mode to be the block-internal single-color approximation compression mode which includes the block run-length compression mode, or it indicates the degree at which the inside of the block will be a compression mode which approximates two or four colors.

By increasing this value, the degree which becomes the block run-length compression mode or single-color approximation compression mode increases. Stated differently, by increasing this value, the degree to which the inside of the block approximates one color in the decompression image increases, and the image quality tends to deteriorate even though the compression rate increases. Therefore, with images which have many background areas or flat areas with little fluctuation in pixel value, by setting th1 higher we can obtain a high compression rate.

Threshold value 2 (hereafter th2) indicates the degree at which the compression mode within the block will be the block-internal two-color approximation compression mode or the block-internal four-color approximation compression mode. Increasing this value raises the proportion of four-color approximations to block-internal two-color approximations. Thus, when setting th2 low, it is possible to obtain a higher quality image in the decompression image even though the compression rate decreases. With manuscripts consisting entirely of scanned images and with complicated CG graphics and the like, setting a low th2 makes it possible to obtain decompression images with less image deterioration.

Threshold value 3 (hereafter th3) shows the degree at which the compression mode within the block will be the block run-length compression mode or the single-color approximation compression mode. By setting this value higher, the proportion of block run-length compression mode usage increases and it is possible to obtain the high compression rate. For images with many background areas, by setting th3 higher, a high compression rate can be obtained.

The following describes an example of the optimum parameter calculation, using a sample input image.

First, when the input image is composed mainly of characters written in ordinary sentences, that image is mostly covered by the background and character/drawing areas, with virtually no CG and scanned image areas. For example, where the area proportion which is output from the image composition analysis circuit 4, is approximately half background and half characters and the output area proportion of background to character to CG to scan=50:50:50:0:0, then the calculated compression parameters, th1, th2, or th3, increases.

In this manner, the compression mode switching circuit 7 is set to select the block run-length compression mode when there are fewer colors within the block (e.g. as the background area), and to select the block-internal two-color approximation compression mode when the majority of the block includes other matter such as text, etc.

As a result, the input image is compressed by the block run-length compression mode, except for the character area, and compressed at a high compression rate. The image quality of the decompression image is compressed by the block run-length compression mode in the background area, however the deterioration of the image quality is not noticeable because the original image also has few pixel changes. Furthermore, the character area is compressed by the two-color approximation compression mode within the block, but the deterioration of the image quality of the decompression image is not noticeable because the original image includes two colors, that is, the text colors and the background colors.

Next, when the input image is composed of simple graphics such as a character, a graph, a chart, and the like, when compared to the mainly text image noted above there is hardly any difference in the background area, but the area of character decreases and the area of the CG increases. Thus there is virtually no scanned image area.

For example, when the area proportion which is output from the image composition analysis circuit 4 is in the ratio of background to character to CG to scan=50:30:20:0, the calculated compression parameter determines th1 and th3, and th2 tends to be smaller than in the case of mainly text image noted above.

In this manner, the compression mode switching circuit 7 is set to the block run-length compression mode when the number of colors is less within the block, e.g. when the input image block is background. Similarly, the compression mode switching circuit is set to the two-color approximation compression mode when most blocks include text and other image areas, and is set to the block-internal four-color approximation compression mode when the block has many colors.

This results, in compression of the input image by the block run-length compression mode except for the character and CG areas, thereby obtaining a high compression rate. While the image quality of the decompression image has its background area compressed by the block run-length compression mode, the deterioration of the image quality is not noticeable because there are few pixel changes in the original image.

Furthermore, the character area is compressed by the block-internal two-color approximation compression mode, and when the block includes simple areas with fewer colors among the CG area, it is also compressed by the block-internal two-color approximation compression mode. The deterioration of the image quality of the decompression image is not noticeable because there were few colors in the original image as well. Among the CG areas, complex blocks containing many colors are compressed by the block-internal four-color approximation compression mode. The decompression image of this mode is of high quality, so the deterioration of the image quality is not noticeable even with complex CG.

Moreover, when the entire input image is composed of the images read in by a scanner, the entire image becomes the scanned images area, so the area proportion which is output from the image composition analysis circuit 4 is expressed as: background: character: CG: scan=0:0:0:100. As a result, the calculated compression parameters th1, th2, and th3 are all set low.

This results in the compression mode switching circuit 7 set to the block-internal four-color approximation compression mode for most of the input image block. This is because the entire input image is a scanned image, so changes in most of the pixel values within the block are large, requiring the block-internal four-color approximation compression. This tends to lower the compression rate of the entire image, However the resultant decompression image is of high quality and the deterioration of the image quality is at a level which is not noticeable.

By means of the above construction, whether the image consists of characters, CG, scanned images, or a mixture of all of these, the image processing apparatus sets the compression parameter after analyzing the proportion in which these exist and uses this parameter value when selecting the optimum compression method for each block. In addition to minimizing deterioration of the image quality, the compression rate of the entire image can be kept below the target compression rate, thus reducing the amount of required memory capacity and decreasing the cost of the entire system.

Figure 5:
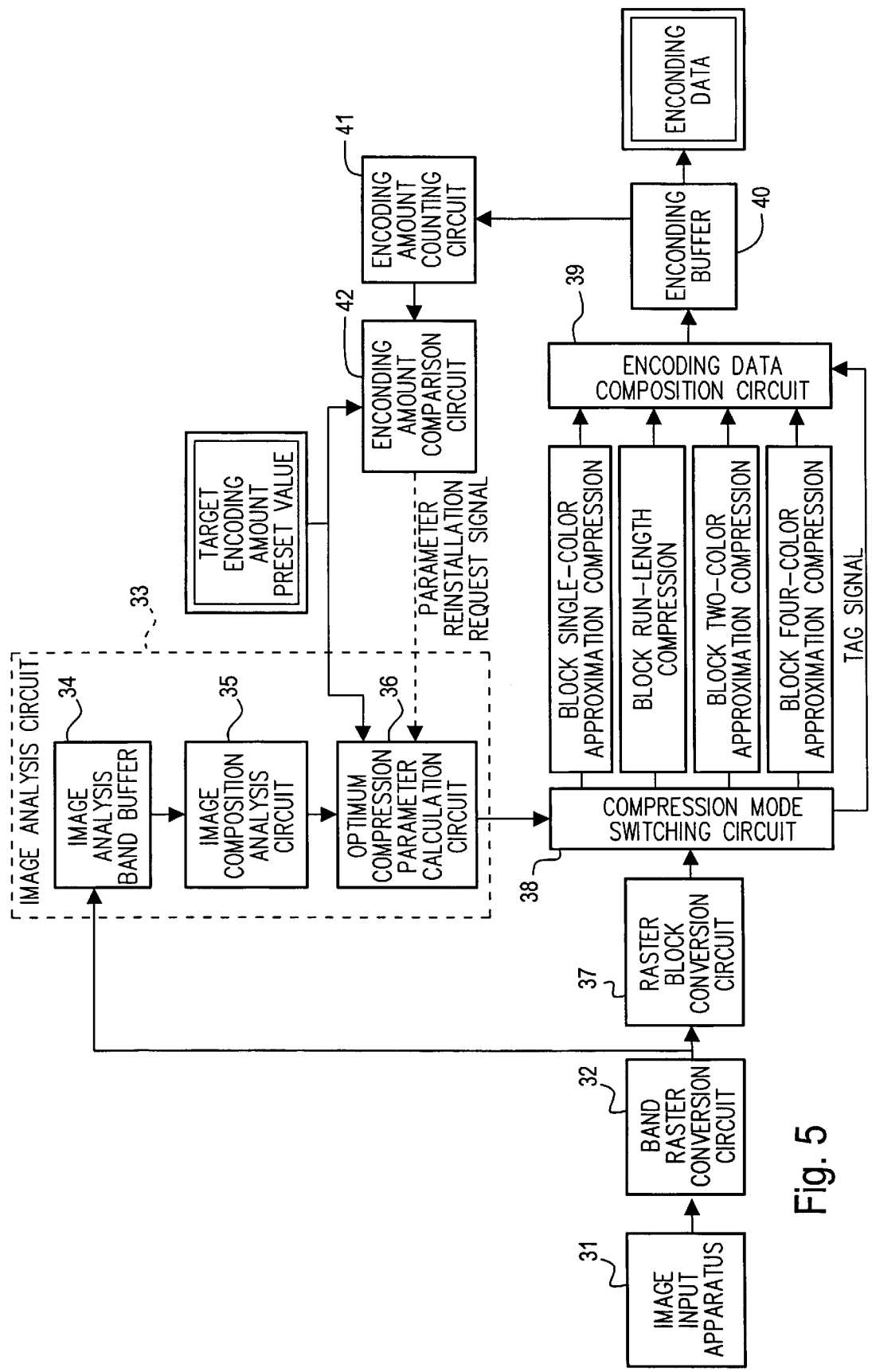
FIG. 5 is a block diagram depicting the encoding circuit of the second embodiment.

FIG. 5 is a block figure of a second embodiment, depicting an example of construction of the encoded circuit of the image processing apparatus.

In this embodiment, the image data which is input from the image input apparatus 31, is first broken down into the band raster, the image is then analyzed on a per band raster basis, and the optimum compression parameter calculated. The band raster is compressed using this resultant parameter to produce encoding data.

The amount of encoding data so produced is 1. compared with the target encoding amount calculated from the predetermined minimum compression rate, and 2. is output to a storage apparatus as encoded data when the target has been attained. When the amount of the encoding data is more than the amount of the target encoding, the system is reset so as to set the optimum compression parameter at high compression, and this band raster is re-compressed. In this manner, the amount of the encoding data produced showing the compression rate is constantly monitored. This parameter-reinstallation re-compression loop is repeated until the target encoding amount is attained for each band raster, making it possible to achieve the minimum compression rate.

The following explains this embodiment in detail. Before inputting the image data from the image input apparatus 31, the maximum value of the encoding data produced by compressing the image data that becomes the target encoding amount is set. This value is set according to, for example, the size of the encoding data buffer and the encoding amount per image, which is converted from the encoding number stored in the encoding storage apparatus.

Image input apparatus 31 inputs image data is input as a raster image. The band raster conversion circuit 32 stores the input image data in line units of from some tens to some hundreds of lines, and separated out for each band raster image. After the compression process of this band raster is completed, the band raster conversion circuit 32 receives the next band raster image from the image input apparatus 31.

Figure 6:
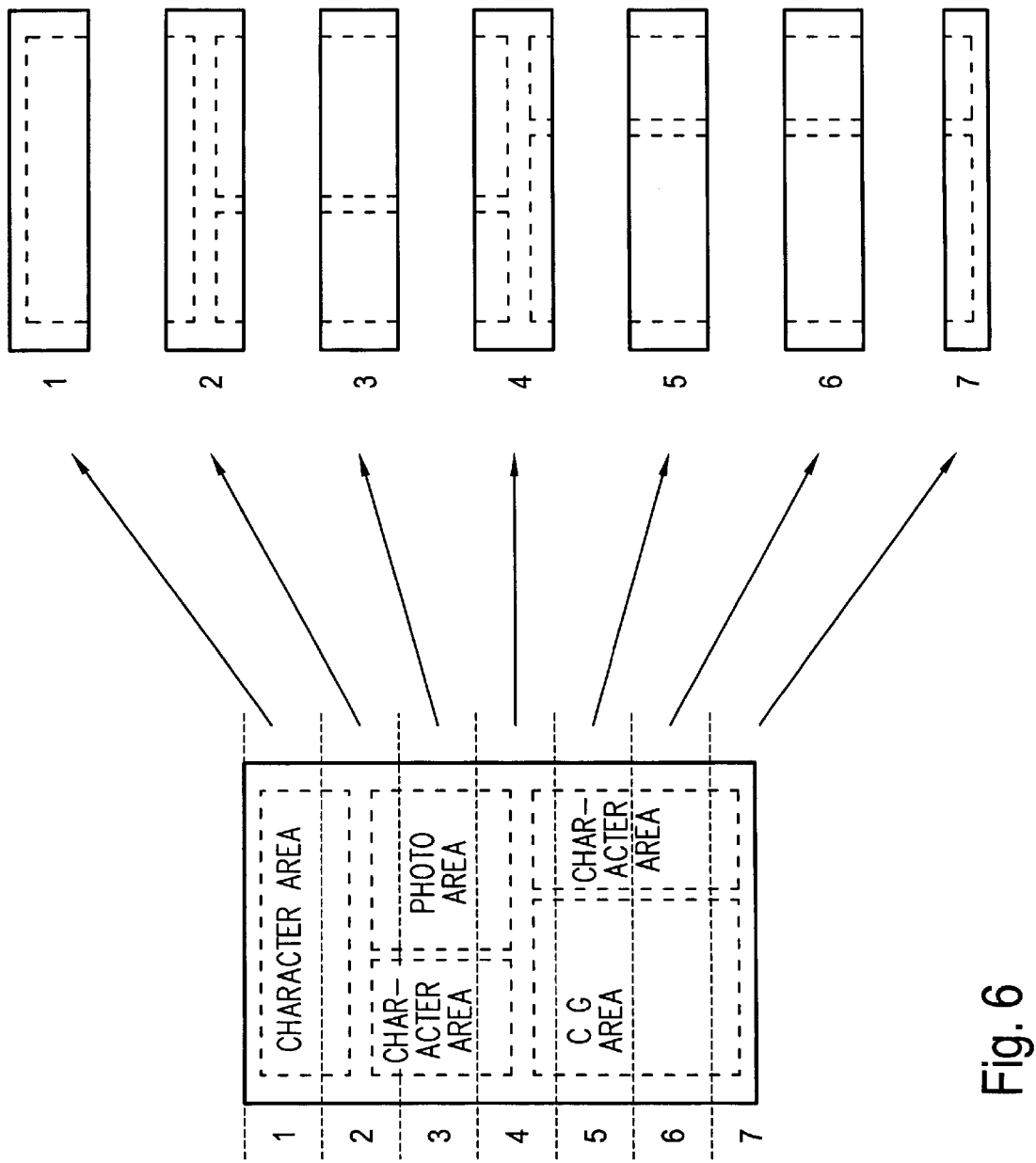
FIG. 6 is a general diagram depicting the band raster of the second embodiment.
Figure 7:
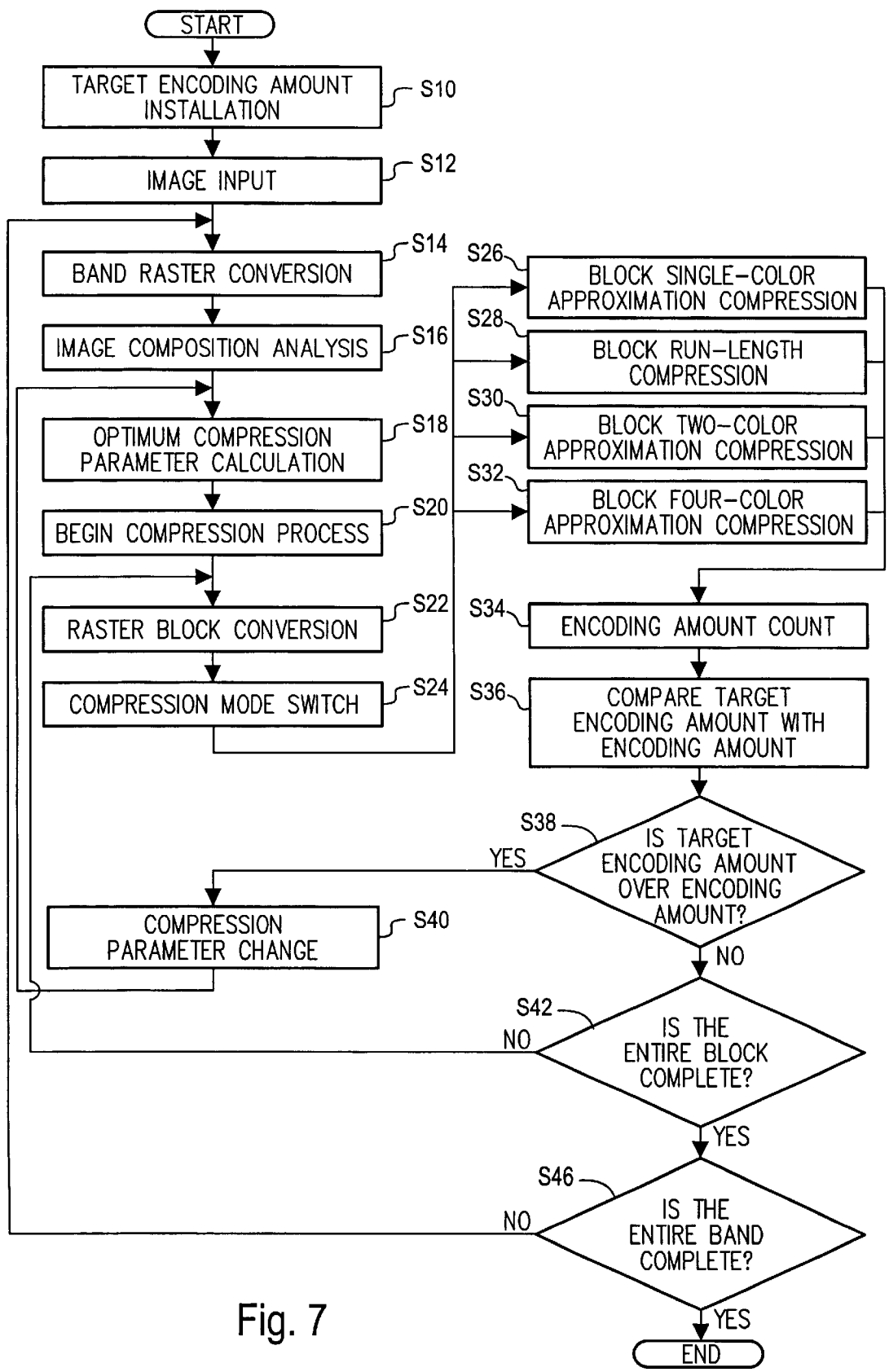
FIG. 7 is a flow chart depicting the encoding process of the second embodiment.

FIGS. 6 and 7 show a conceptual figure of the band raster and a flow chart showing the movements of the band raster, respectively. The band raster image is in the condition which is separated by the same width horizontally (S 14). The following explanation describes the band raster as an image which is separated into 128 line units, however this embodiment is not limited to this.

Before performing the compression process, the band raster image is sent to the image analysis circuit 33 (S 16). The image analysis circuit 33, which acts as an analysis means, is composed of the image analysis band buffer 34, the image construction analysis circuit 35, and the optimum compression parameter calculation circuit 36. The image analysis circuit 33 stores the received band raster image in the image analysis band buffer 34. The image construction analysis circuit 35 refers to the image data inside the image analysis band buffer 34, and calculates the area proportion of each image area as with the first embodiment.

The optimum compression parameter calculation circuit 36 calculates the three thresholds, as with the first embodiment, by referring to this area proportion (S 18). The band raster image is separated by the raster block conversion circuit 37 into blocks which take the 4×4 pixel as one unit, and the image is then sent to the compression mode switching circuit 38.

The compression mode switching circuit 38, which acts as a selection means, selects which compression method is suitable for each block from the plurality of compression methods, based upon the threshold value information obtained from the optimum compression parameter calculation circuit 36 (S 24). Like the first embodiment, this embodiment has four compression-method modes: the block single-color approximation compression mode, block run-length compression mode, block-internal two-color approximation compression mode, and blockinternal four-color approximation compression mode.

The mechanism of the compression mode switching circuit 38 and the content of each compression mode are the same as previously described for the first embodiment. The compression process is performed by selecting the optimum compression mode for each block (S 26—S 32). The resulting encoding data is stored in the encoded buffer 40.

The encoding amount count circuit 41, which acts as an encoded amount monitoring means, counts the encoded data amount which is written in encoded buffer 40 (S 34) and calculates the current encoded data amount. The encoded amount comparison circuit 42, acting as an encoded amount comparison means, compares the current encoded data amount with the target encoded amount (S 36), and determines whether or not the current encoded data amount exceeds the target encoded amount (S 38).

From this determination, if the current encoded data amount is less than the target encoded amount, the compression process continues as is. However, if the current encoded data amount exceeds the target encoding amount (S 38), the encoded amount comparison circuit 42 sends a parameter set request signal to the image analysis circuit 33. The image analysis circuit 33, upon receipt of which received the resetting request signal sets the parameter at a higher compression than that of the current parameter installation in the optimum compression parameter calculation circuit 36 (S 38). This results in recompressesion under new parameters from the beginning of the band raster image currently being processed.

If the encoded amount again exceeds the target encoded amount (S 38) as the compression process continues, the parameters are reset again (S 40) and the compression process is restarted from the beginning. If the compression process for the band raster image portion finishes below the target encoded amount, then processing of the band raster image continues. The above process is repeated until one image is completed.

When the current encoded data amount exceeds the target encoded amount in the encoded amount comparison circuit 42, it is then necessary to reset the compression parameters and redo the compression process for the band raster portion to remain below the target encoded amount for each band raster. The following shows one example of the setting of the compression parameter.

Described below is the method used to reset the compression parameters when the input band raster image consists mainly of text and exceeds the target encoded amount during the compression process. Because the image consists mainly of characters, the resolution regeneration is more important than the gradation regeneration in the decompression image.

In order to maintain the edges of characters and the smoothness of straight lines, the overall encoded amount is reduced below the target encoded amount by grading the color regeneration slightly. For this to occur, the optimum compression parameters (the three thresholds described in the first embodiment) are set in such a way that the value of threshold 2, which influences the degree to which two- or four-color approximate the number of colors within the block, is set to increase the two-color proportion. Thus, the value of threshold 2 is increased. When the proportion which exceeds the target encoded amount is large, the increase ratio of threshold 2 is made larger. In this manner, the encoded amount of the band raster decreases and fits within the target encoded amount.

The following describes the method of resetting the compression parameter when the input band raster image combines both text and pictures and exceeds the target encoded amount during the compression process. Image data like this mixes 1. text areas requiring resolution regeneration more than gradation regeneration and, 2. conversely, picture areas requiring gradation regeneration more than resolution regeneration.

It is thus necessary to reduce the encoded amount of either or both areas having different image characteristics so as to remain below the target encoded amount. In general, due to the structure of human vision, it is easier to recognize the deterioration of the resolution regeneration than that of the gradation regeneration, so in this embodiment the compression parameters are reset in the direction of reducing the encoding amount by reducing the gradation regeneration.

First, in order to make the approximate number of colors within the block changes from four to two, the ratio is increased. This is accomplished by increasing the value of threshold 2. Furthermore, the value of threshold 1, indicating the ratio within a block of block-internal single-color approximation which includes block run-length compression mode to multi-color (two-or four-color) approximation, is raised so as to increase the degree to which block-internal single-color approximation is selected. In this manner, the band raster image proportion in which block-internal four-color approximation is selected decreases, and the proportion in which block-internal single-color approximation and two-color approximation is selected increases. As a result, the encoded amount decreases and so as to fit within the target encoded amount.

The following describes the method of resetting the compression parameters when the input band raster image consists mainly of images read in by a scanner and the like and exceeds the target encoded amount during the compression process. It is necessary to have more resolution regeneration than the gradation regeneration because the entire image is scanned.

However, in order to get that high compression rate, it is necessary to degrade the gradation regeneration and resolution regeneration and reduce the encoded amount. To accomplish this, the compression parameters are reset in order to increase the proportion in which block-internal two-color approximation is selected over four-color approximation, and the degree to which block run-length is increased so as to reduce the encoded amount as a whole.

This is accomplished when the proportion in which two colors are used for approximation within the block instead of four is increased. This results in an increased value of threshold 2. Moreover, in order to increase the proportion in which block run-length is selected, the value of threshold 3 is increased. As a result, the encoded amount decreases and fits within the target encoded amount.

The mechanism of the image decompression circuit is the same as that of the decompression circuit described earlier for the first embodiment.

By the above construction, even for images consisting of text, CG, scans or a combination of these, the invention sets the compression parameters after analyzing the proportion in which they exist and uses these parameter values when selecting the optimum compression method for each block. Furthermore, target compression rate is preset as the encoded amount. In the case when this is exceeded during the compression process, the apparatus is equipped with a feedback function which resets the parameters, making it possible to minimize the deterioration of the quality of the decompression image and maintain the compression rate for the entire image below the target compression rate, thus reducing the required memory capacity and the resultant cost of the entire system.

Figure 8:
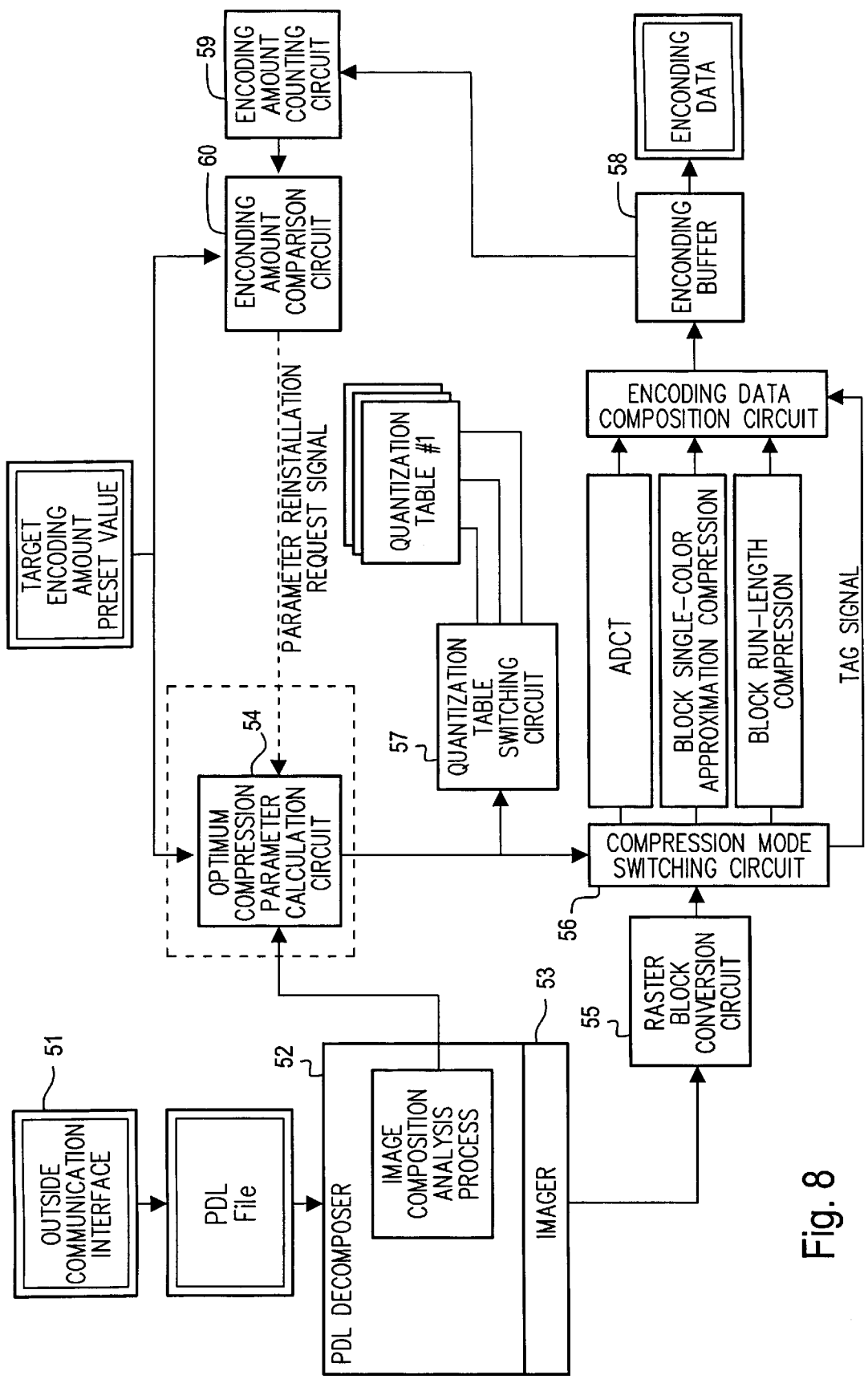
FIG. 8 is a block diagram depicting the encoding circuit of the third embodiment.

FIG. 8 is a block chart which shows an example of the structure of the encoded circuit of the image processing apparatus of a third embodiment.

Print data, described by the page descriptive language (PDL) input from the external communications interface 51 acting as an input means is interpreted in the PDL decomposer 52. A printable raster image is then produced by the imager 53. Image composition analysis is performed simultaneously with the interpretation process and the optimum compression parameter is calculated.

The raster image is then compressed using this optimum compression parameter and the encoded data produced. The amount of this encoded data is compared with a set target encoded amount and output as encoded data to a storage device when this target has been reached.

Thus, the amount of encoded data produced which is indicative of the compression rate is constantly monitored. It is possible to achieve the target encoded amount by repeating this parameter-reset/recompression loop so as to bring the produced encoded amount below the target encoding amount.

The following explains this process in greater detail.

The external communications interface 51 receives the print data file (PDL file) described by the page descriptive language and sent via a host computer or network. The PDL decomposer 52 receives the PDL file, analyzes the print data described in the PDL and adds the data according to the description of the PDL file. The analysis results are sent to the imager 53.

The imager 53 produces a printable raster image, based upon the results of the analysis of the PDL file. The PDL decomposer 52 and imager 53 comprise the development means of the present invention and are composed of software executed by a CPU.

The image composition analysis process is performed simultaneously with the PDL file analysis process inside the PDL decomposer 52. The proportion of the area covered by each of a plurality of areas having different image characteristics within the image to be printed is calculated with reference to the analysis process results and that result sent to the optimum compression parameter calculation circuit 54.

In this embodiment, the PDL decomposer 52 comprises the analysis means of the present invention. Like the first and second embodiments, this analysis means calculates the proportions covered by each of the following areas: (1) background, (2) text/drawing, (3) CG, (4) scan.

The optimum compression parameter calculation circuit 54 determines the plurality of the threshold value and the quantization table select signal by referring to the result of the image composition analysis process. In this embodiment, the plurality of thresholds uses two thresholds. The threshold value is used in the compression mode switching circuit 56, which acts as a selection means and which determines which compression method is selected. The quantization table selection signal is used for the selection of the quantization table in the ADCT compression circuit.

At this optimum compression parameter calculation circuit 54, the threshold value and the quantization table selection signal are set in such a way that the encoded data amount of the entire image fits the target encoded amount. For example, when the image to be compressed contains many scanned images and the resultant encoded data amount so produced might therefore exceed the target encoding amount, the threshold is set so that the compression mode that can gain the higher compression rate is selected most often.

Furthermore, the quantization table selection signal selects the quantization table which becomes high quantization. Conversely, when it is predicted that the image to be compressed has many background areas and obtains the higher compression rate, it is possible that the composed encoded data amount falls far short of the target encoded amount and is susceptible to overcompression. In this case, it is not necessary to compress the image more than necessary, the compression rate declines and the threshold is set so as to select the compression mode with a high decompression image quality. Furthermore, the quantization table selection signal selects the quantization table which becomes low quantization.

The raster block conversion circuit 55 outputs the raster image from the imager 53 in blocks of 8×8 pixels. In this embodiment, one block is assumed to consist of 8×8 pixels, however the present invention is not limited to this.

Based upon the two thresholds obtained from the optimum compression parameter calculation circuit 54, the compression mode switching circuit 56 selects which compression method is suitable from among the plurality of the compression methods for each and every block-unit image which is input from the raster block conversion circuit 55. In this embodiment, there are four possible compression methods: block run-length compression mode, block-internal single-color approximation compression mode, ADCT compression mode (high quantization), and ADCT compression mode (low quantization).

Figure 9:
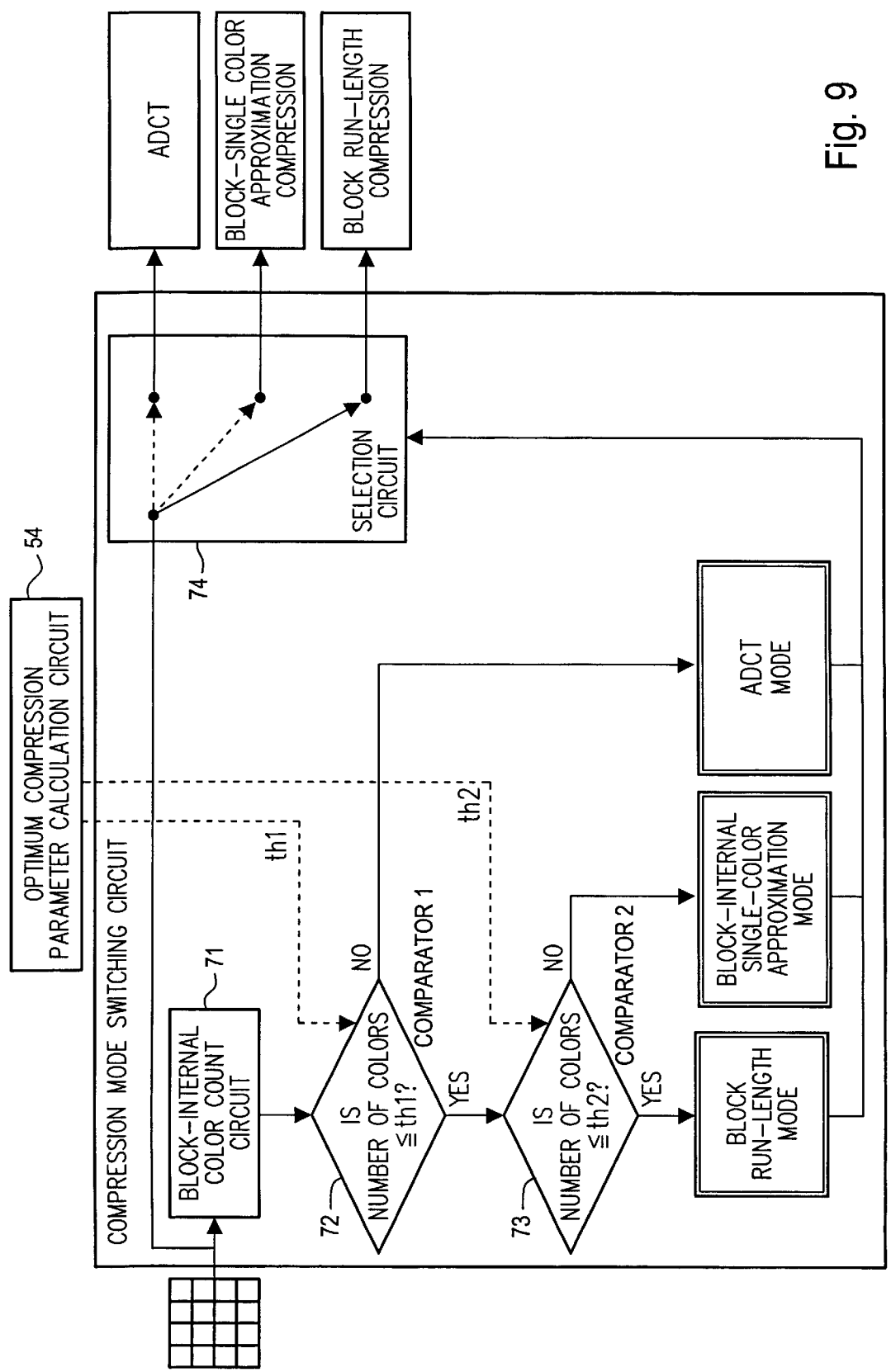
FIG. 9 is a block diagram depicting the compression mode switching circuit of the third embodiment.

FIG. 9 shows a block figure of the compression mode switching circuit 56. The block-internal color count circuit 71 calculates the number of colors included within the block. Comparator (1) 72 compares the threshold value 1 calculated by the optimum compression parameter calculation circuit 54 with the color-count data calculated by the in-block color count circuit 71.

The compression mode of this block will be the ADCT compression mode when the number of colors is more than the threshold value 1 proceeding to comparator (2) 73 when the number of colors is less than the threshold value 1. Like the comparator (1) 72, the comparator (2) 73 compares the number of colors with the threshold value 2 which was calculated by the optimum compression parameter calculation circuit 54.

The compression mode of this block will be the in-block single-color approximation compression mode when the number of colors is more than the threshold value 2; and the compression mode of this block will be the block run-length compression mode when the number of colors is less than the threshold value 2. Based upon the above determination results, the selection circuit 74 switches the input block image to the second compression circuit.

The block run-length compression mode and in-block single-color approximation compression mode are the same as described above in the first and second embodiments.

Figure 10:
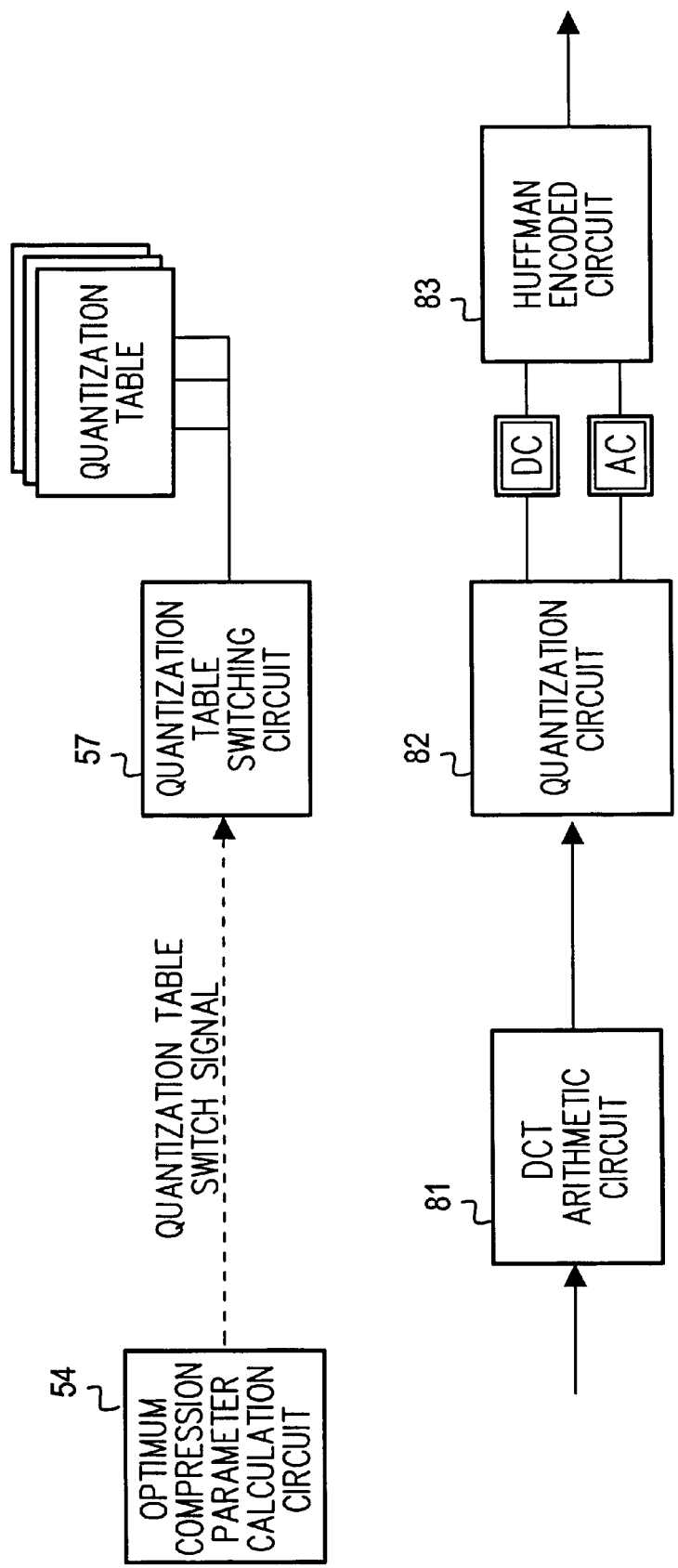
FIG. 10 is a block diagram depicting the ADCT compression circuit of the third embodiment.

The ADCT compression mode is a compression method typified by the JPEG baseline method, which is the standard encoded method for color facsimile. Quantization is performed after Discrete Cosine Transform (DCT) conversion and the data is encoded by the Huffman method. FIG. 10 shows a block figure of the ADCT compression circuit.

The input block image undergoes DCT conversion by the DCT calculation circuit 81 and is quantized by the coefficient data of the quantization table by the quantization circuit 82. That quantized DCT coefficient is encoded by the Huffman encoded circuit 83.

By means of and within the quantization table selection signal obtained from the quantization parameter, the quantization table is switched. FIG. 11 shows an example of a quantization table. In the case of utilization of the high quantization table, it is possible to gain the compression rate but the quality of the decompression image deteriorates somewhat. In the case of using the low quantization table, the compression rate declines but the decompression image quality is high.

The encoded data composition circuit, as with the first and second embodiments, adds a tag signal which shows the compression circuit selected before encoding as one unit per block of encoded data. Further, when the ADCT compression circuit is selected, the tag which shows the quantization table used is also added.

In this embodiment, the four compression methods are used: block run-length compression mode, block-internal single-color approximation compression mode, ADCT compression mode (high quantization), ADCT compression mode (low quantization)—so it is possible to determine these four ways if there are two bits as a tag bit. The composed encoded data will be stored in the encoded buffer 58.

Figure 12:
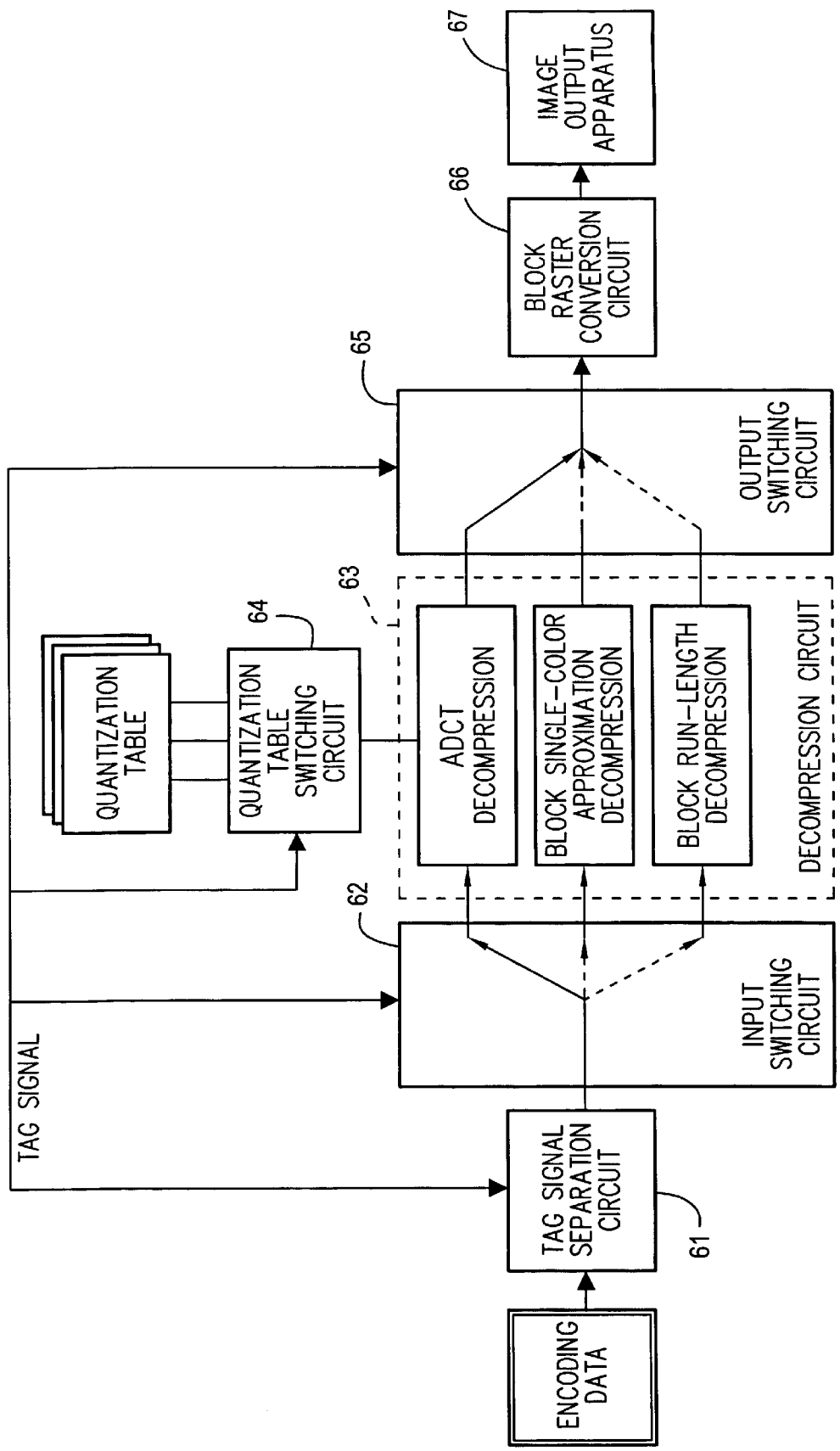
FIG. 12 is a block diagram depicting the decomposition circuit of the third embodiment.

FIG. 12 is a block figure showing an example of the composition of the encoding circuit of the image processing apparatus of this embodiment. The encoding data is sent to the tag signal separation circuit 61 and a specific number of bits acting as the tag signal (two bits in this embodiment) are separated from the lead data and set as the tag signal. Depending on the content of this tag signal, it is possible to determine which compression mode was used to compress the succeeding encoded data lines.

Because the code length of a one-block portion differs depending on the compression mode, the encoded data of a one-block portion is read from the succeeding data according to the compression mode. For instance, a single block consists of eight bits in the block-internal single-color approximation compression mode and 16 bits in the block run-length compression mode. However, in the case of the ADCT compression mode, the encoding data length can vary, so during decompression the encoding data is read in bit units until the data of the 8×8 pixel portion can be decompressed.

Moreover, the read-out encoding data is sent to the input switching circuit 62. According to the tag signal, the input switching circuit 62 selects appropriate decompression circuit for the encoding data from among the plurality of decompression circuits 63 and sends the encoded data to that decompression circuit.

The decompression circuit 63 has three decompression circuits: block single-color approximation length circuit, block run-length decompression circuit, and ADCT decompression circuit. The mechanism of the block single color approximation decompression circuit and block run-length decompression circuit are the same as described for the first and second embodiments.

Figure 13:
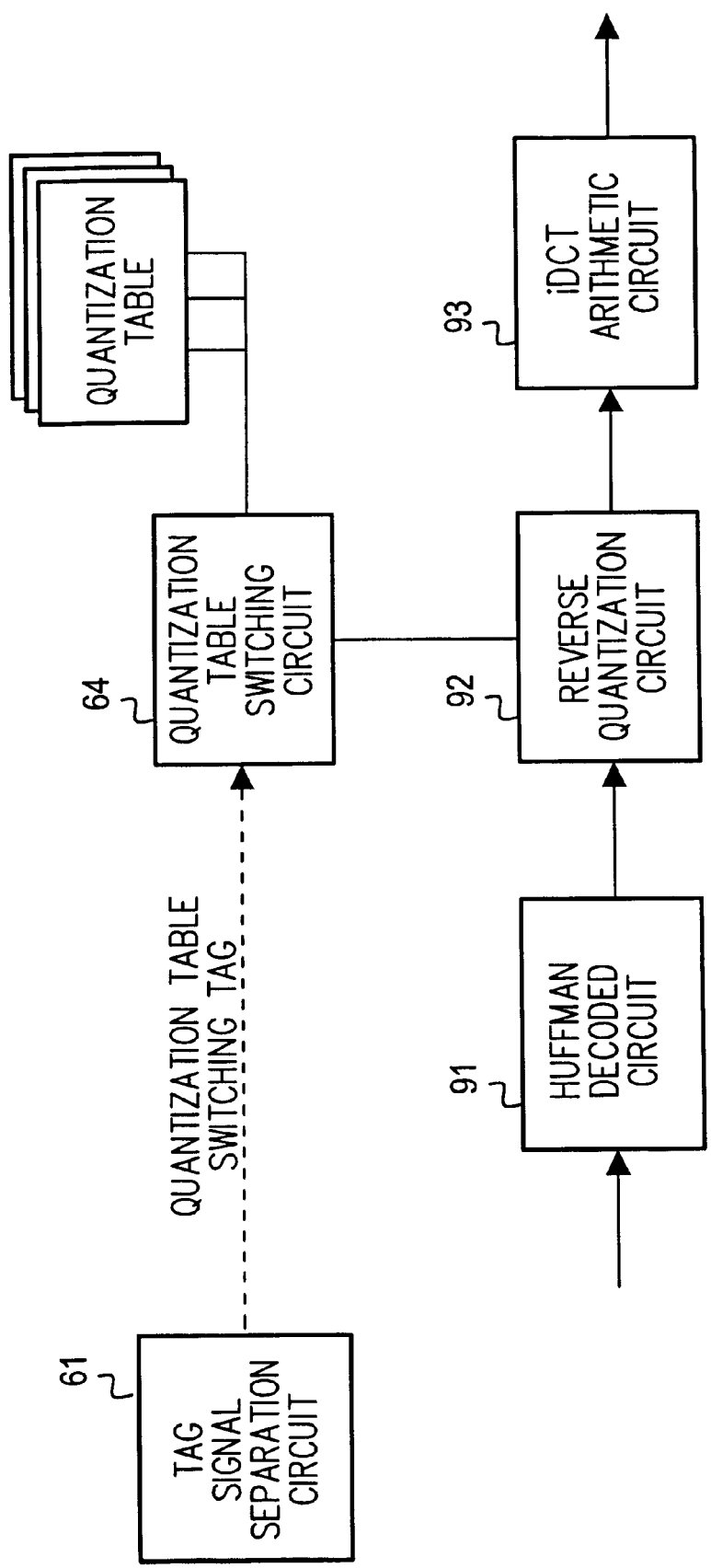
FIG. 13 is a block diagram depicting the ADCT decomposition circuit of the third embodiment.

FIG. 13 shows a block figure of the ADCT decompression circuit. The input encoding data was first decoded by the Haffman method, treated by the reverse-quantization process, treated by the iDCT calculation process, and revised into the block image data. In case of the ADCT decompression circuit of this embodiment, the quantization table switching circuit 64 receives the tag signal from the tag signal separation circuit 61 and is reverse-quantized using the quantization table used during compression.

As described earlier, in this embodiment, the raster image is produced from the PDL file and the optimum compression method for each block is selected so that the encoded data amount produced after the compression is less than the target encoded amount, and the compression process continues. However, as a result of monitoring the encoded data amount so produced, when the encoding data amount exceeds the target encoding amount, the compression parameters are reset and the compression process repeated. The following describes the flow of that process.

As the compression process proceeds, the encoded data is stored in the encoded buffer 58. The encoded amount count circuit 59, which acts as an encoded amount monitoring means, calculates the encoded data amount which is stored into this encoded buffer and the encoded amount count circuit 59 sends the encoded data amount to the encoded amount comparison circuit 60, which acts as an encoded amount comparison means.

The encoded amount comparison circuit 60 compares the target encoded amount with the current encoded data amount. When the current encoded data amount is less than the target encoded amount, the compression process is continued as is. When the encoded data amount up to the present exceeds the target encoded amount, a parameter reset request signal is sent to the optimum compression parameter calculation circuit 54.

The optimum compression parameter calculation circuit 54, having received the setting request signal, changes the parameters so as to increase the compression above the current parameter setting, and refers the compression process from the head of the image. As the compression process proceeds and the encoded data amount again exceeds the target encoded amount, the parameters are reset and the compression process is redone from the head of the image.

The following describes an example of the setting of a compression parameter.

First, the image to be compressed consists mainly of texts and the encoded data exceeds the target encoded amount during the compression process. If the image is mainly text, then there will likely be few colors included in the entire image, which will increase the value of threshold 1. In this manner, the number of blocks for which ADCT compression is selected decreases and the number of blocks for which the high compression rate modes such as the in-block single-color approximation compression mode, the block run-length compression mode increases. As a result, a high compression rate can be achieved.

Next, when the image to be compressed consists mainly of scanned pictures and exceeds the target encoded amount during the compression process, resetting the compression parameter occurs. Compressing an image consisting mainly of scanned pictures by the block run-length compression mode may degrade the quality of the decompression image. For this reason, the threshold linked to the logic of the compression mode switch is kept as is and processing performed in the optimum compression parameter calculation circuit by using the encoding table of the high quantization which is able to gain compression rate as the quantization table of the ADCT compression. This results in a high compression rate for the entire image.

In the next example, the compression parameters are reset when the image to be compressed consists of mixed text and photos and exceeds the target encoded amount during the compression process. The compression parameters are set to get high compression in each area because text and photo areas co-exist.

In other words, in order to increase the compression rate of the text image area, threshold 1 is increased as discussed above for images consisting mainly of text. In order to set a higher compression rate for the photo image area, the quantization table selection signal is set so as to use the high quantization table in the ADCT encoding. As a result, a high compression rate can be achieved for the entire image.

By the above composition, even when the PDL data is compressed in printers, etc., the compression parameters are set so as to analyze in what proportion do data of varying characteristics exist when selecting the optimum compression method for each block. Further, the target compression rate is set in advance as the encoded amount; when this is exceeded during compression the apparatus is equipped with a feedback function, thus, minimizing deterioration of the quality of the decompression image and at the same time the compression rate for the entire image is kept at or near the target compression rate, thereby reducing the required memory capacity and decreasing the cost of the entire system.

According to the above description, conventionally mixed text/drawing, CG and scanned image data involving switching the compression method for each block; thus where compressing approximately, controlling the resultant compression rate and encoded amount was difficult. However, the image processing apparatus as set forth in the present invention adds a function to calculate the optimum compression parameter to analyze the image composition of the entire image data and use the value of this parameter when selecting the compression method for each block, thereby making it possible to achieve the target compression rate for the entire image data and to provide an image processing apparatus with a low overall-system cost.

What is claimed is:

1. An image processing apparatus, comprising:
   an image input apparatus to input image data related to an image composed of image portions having different image characteristics;
   an image data analyzer to analyze the image data in terms of pixel block units to discern the image portions having different image characteristics in the image, and the proportion of such portions with different image characteristics in the image;
   an image data compression apparatus having a plurality of different image compression methods; and
   a compression mode selector to select, for each pixel block unite an image data compression method from the plurality of different image compression methods based on a determination of the proportional amounts of such image portions having different image characteristics in the image.

2. The image processing apparatus of claim 1, further comprising:
   a preset target encoded amount, the target encoded amount resulting from a target compression rate of the image data to be compressed;
   a compressed image encoding data output apparatus to output encoded data of the compressed image, the encoded data including a resultant compression rate obtained by the image data compression apparatus;
   an encoded amount monitor to monitor the encoded data output by the compressed image encoding data output apparatus; and
   an encoded amount comparator to compare the encoded data in the encoded amount monitor with the target encoded amount.

3. The image processing apparatus of claim 2, wherein the compression apparatus is re-selected when the results of a comparison by the encoded amount monitor indicates that the encoded data exceeds the target encoded amount and the results of an analysis by the analyzer.

4. The image processing apparatus of claim 1, wherein said analyzer calculates the proportion of the image portions in the image using the image characteristics of the image portions.

5. The image processing apparatus of claim 1, wherein the image data includes code image data using page descriptive language and wherein the image processing apparatus further comprises:
   a rasterizer to interpret the page descriptive language and render the code image data into raster data; and
   discernment apparatus for discernment of image attributes of the code image data.

6. The image processing apparatus of claim 1, wherein the image portions include at least one of a background portion, a character or drawing portion, a computer graphics portion, and a scanned image portion.

7. The image processing apparatus of claim 1, wherein the proportion of such image portions is based on image characteristics of at least one of a background image portion, a character or drawing image portion, a computer graphics image portion, and a scanned image portion.

8. The image processing apparatus of claim 1, wherein the proportion of such image portions is determined based on one of the minimum and maximum values of the coordinates for each of the one or more image portions, a count of a number of pixels in each of the one or more image portions, and a count of a number of blocks of a predetermined size in each of the one or more image portions.

9. The image processing apparatus of claim 1, wherein the analyzer determines at least one threshold value from the determined proportion, the selector compares the at least one threshold to a color count of the number of pixel colors in a first image portion, and the selector selects the image data compression method based on the comparison of the at least one threshold to the color count.

10. The image processing apparatus of claim 1, wherein the plurality of different image compression methods includes at least one of a block single-color approximation compression method, a block run-length compression method, a block-internal two-color approximation compression method, an adaptive discrete cosine transform compression method, and a block-internal four-color approximation compression method.

11. The image processing apparatus of claim 1, wherein the selected image data compression method compresses a first image portion into blocks of compressed image data and a tag signal is added to each block, the tag signal identifying the selected image data compression method.

12. An image processing method, comprising:
   receiving and converting digital data for an image composed of portions having different image characteristics;
   analyzing the digital image data in terms of pixel block units to discern the portions having different image characteristics in the image, and the proportion of such portions of different image characteristic in the image; and
   selecting, for each pixel block unit, an image data compression method from a plurality of different image data compression methods based on a determination of the proportional amounts of such portions having different image characteristics in the image.

13. The method of claim 12, further comprising:
   determining a target encoded amount resulting from a target compression rate of the image data;

outputting encoded data of an image portion, the encoded data including a resultant compression rate obtained by the selected image data compression method; and comparing the encoded data with the target encoded amount.

14. The method of claim 13, further comprising selecting a different image data compression method if the results of the comparing step indicate that the encoded data exceeds the target encoded amount.

15. The method of claim 12, wherein the proportion is based on characteristics of at least one of a background image portion, a character or drawing image portion, a computer graphics image portion, and a scanned image portion.

16. The method of claim 15, wherein the proportion is determined based on one of the minimum and maximum values of the coordinates for each of one or more image portions, a count of a number of pixels in each of the one or more image portions, and a count of a number of blocks of a predetermined size in each of the one or more image portions.

17. The method of claim 12, further comprising:

determining at least one threshold value from the determined proportion; and comparing the at least one threshold value to a color count of the number of pixel colors in an image portion, wherein the selection of a selected image data compression method is based on the comparison of the at least one threshold value to the color count.

18. The method of claim 12, further comprising:

compressing an image portion into blocks of compressed image data using the selected image data compression method; and adding a tag signal to each block of the compressed image data, the tag signal identifying the selected image data compression method.

* * * * *